PARALLEL DIGITAL ARITHMETIC UNIT UTILIZING A SIGNED-DIGIT FORMAT

Filed Dec. 22, 1965 5 Sheets-Sheet 1

INVENTOR
J. E. ROBERTSON
BY
Stephen B. Judlowe
ATTORNEY

PARALLEL DIGITAL ARITHMETIC UNIT UTILIZING A SIGNED-DIGIT FORMAT

Filed Dec. 22, 1965 5 Sheets-Sheet 2

Aug. 19, 1969 J. E. ROBERTSON 3,462,589

PARALLEL DIGITAL ARITHMETIC UNIT UTILIZING A SIGNED-DIGIT FORMAT

Filed Dec. 22, 1965 5 Sheets-Sheet 5

United States Patent Office 3,462,589
Patented Aug. 19, 1969

3,462,589
PARALLEL DIGITAL ARITHMETIC UNIT UTILIZING A SIGNED-DIGIT FORMAT

James E. Robertson, Champaign, Ill., assignor to Bell Telephone Laboratories, Incorporated, New York, N.Y., a corporation of New York
Filed Dec. 22, 1965, Ser. No. 515,577
Int. Cl. G06f 5/02, 7/38
U.S. Cl. 235—175 15 Claims

ABSTRACT OF THE DISCLOSURE

A digital arithmetic unit that performs parallel addition or subtraction with minimal carry or borrow propagation between adjacent stages comprises a plurality of cascaded adder stages. Each stage generates a binary sum in a signed-digit format responsive to a signed-digit augend, an addend in conventional binary form and a carry digit supplied by the previous stage. The carry digit generated by each stage is solely a function of the augend and addend information supplied to that stage.

This invention relates to data processing circuits and, more specifically, to a computer arithmetic unit which rapidly effects digital addition and subtraction.

Adder circuits, subtractor circuits, and combined adder-subtractor arrangements are employed in digital computer organizations to perform the four fundamental arithmetic operations of addition, subtraction, multiplication and division. With respect to the latter two processes, it is noted that multiplication is generally performed in the binary machine domain as a recursive series of additions and shifts, or by summing logarithms, while division is correspondingly effected by subtraction operations.

In a typical binary computer employing a parallel data mode for speed considerations, $n$ substantially identical adder-subtractor stages are generally utilized where $n$ is the maximum number of digits in the arithmetic quantities which are to be operated upon. Each stage is supplied with addend or subtrahend, augend or minuend, and carry or borrow signals, and is operative to generate sum or resultant, and carry or borrow output signals, with the latter quantity being supplied to a contiguous stage.

One factor which limits the maximum rate of operation of multidigit parallel adder circuits, subtractor circuits or combined adder-subtractor circuits is the carry or borrow ripple which is propagated from the lower order digits towards the higher order digits. In general, a computer having a capacity of $n$ bits or digits and requiring $t$ seconds to accomplish one addition operation will have a maximum carry or borrow ripple time of $n \cdot t$ seconds. In most applications, it is impractical to provide gating circuits for predeterming the carry or borrow information for every possible combination of addend and augend or subtrahend and minuend. Therefore, it is the usual practice to allow a time equal to the maximum possible ripple time for each addition or subtraction.

The disadvantages of the serially propagated carry ripple have been recognized in the past, and circuits for providing simultaneous carry propagations have been proposed. In these arrangements, gate circuits connect each adder-subtractor stage to all previous stages. All carries are generated simultaneously, such that ripple time is completely eliminated. However, the number of gate circuits required increases very rapidly as the digital capacity of the computer is increased so that it becomes impractical to employ this type of arrangement in computers having a capacity of more than a few digits. Also, combined adder-subtractor stages may require considerably more equipment than either a single-functioning adder or a subtractor organization.

Other proposals have been made to organize the stages in groups with simultaneous carry within each group, and a serial carry between groups in order to effect a compromise between ripple propagation time and equipment requirements. In this type of arrangement, the carry ripple time is proportional to the number of groups employed. If a relatively small number of groups in utilized in order to reduce ripple time, the equipment required in each group is quite large. If a reltaively large number of groups is employed in order to conserve equipment, the ripple time will remain undesirably long.

Still another arrangement has been suggested by A. Avizienis in an article entitled "Signed-Digit Number Representations for Fast Parallel Arithmetic," published at page 389 of the IRE Transactions on Electronic Computers, September 1961. This proposed organization utilizes adder stages supplied with signed-digit addend and augend quantities as a vehicle to limit carry ripple. However, such an arrangement would require redundant data storage facilities.

It is therefore an object of the present invention to provide an improved digital arithmetic unit.

More specifically, an object of the present invention is the provision of an adder-subtractor organization which may be relatively simply and economically constructed, and which operates at a relatively rapid rate of speed by limiting carry and borrow ripple propagation.

Another object of the present invention is the provision of a relatively fast adder-subtractor organization which eliminates storage redundancies by accepting arithmetic data in a conventional binary coded format.

These and other objects of the present invention are realized in a specific illustrative digital arithmetic unit which effects parallel addition or subtraction with minimal carry propagation between contiguous stages. The arrangement comprises a plurality of cascaded adder stages each of which generates a two-digit sum in a signed-digit format responsive to a signed-digit augend, an addend in conventional binary form, and a carry digit supplied by the previous stage. The carry digit generated by any stage is solely a function of the augend and addend associated therewith, and does not depend on information characterizing preceding adder stages.

Subtraction is effected by employing a plurality of Exclusive OR logic gates which are selectively operable to reverse the sign of the sum and/or augend quantities.

It is thus a feature of the present invention that a computer arithmetic unit include a plurality of adder stages employing combinatorial networks, data source circuitry for supplying to each stage signed-digit and/or conventional binary arithmetic input quantities, and a plurality of Exclusive OR gates for complementing selected signed-digit variables associated with the adder stages.

It is another feature of the present invention that an arithmetic unit include a plurality of cascaded adder stages each including first and second combinatorial networks, circuitry for supplying augend Boolean variables $s$ and $x$, and an addend variable $y$ to each of the first networks, with the first networks including circuitry for generating two Boolean variables $m$ and $c$ and circuitry for translating the variable $m$ to the associated second network and for translating the variable $c$ to the second network included in a contiguous stage, with the second networks including means for generating two additional Boolean variables $t$ and $z$, wherein $$m=x\bar{y}+y\bar{x}$$
$$c=\bar{s}x+\bar{x}y$$
$$t=m, \text{ and}$$
$$z=m\bar{c}_{i-1}+c_{i-1}\bar{m}$$

where $c_{i-1}$ comprises the carry signal supplied by a previous adder stage.

A complete understanding of the present invention and of the above and other features, advantages and variations thereof may be gained from a consideration of the following detailed description of an illustrative embodiment thereof presented hereinbelow in conjunction with the accompanying drawing, in which.

Figures 1, 2, 3:
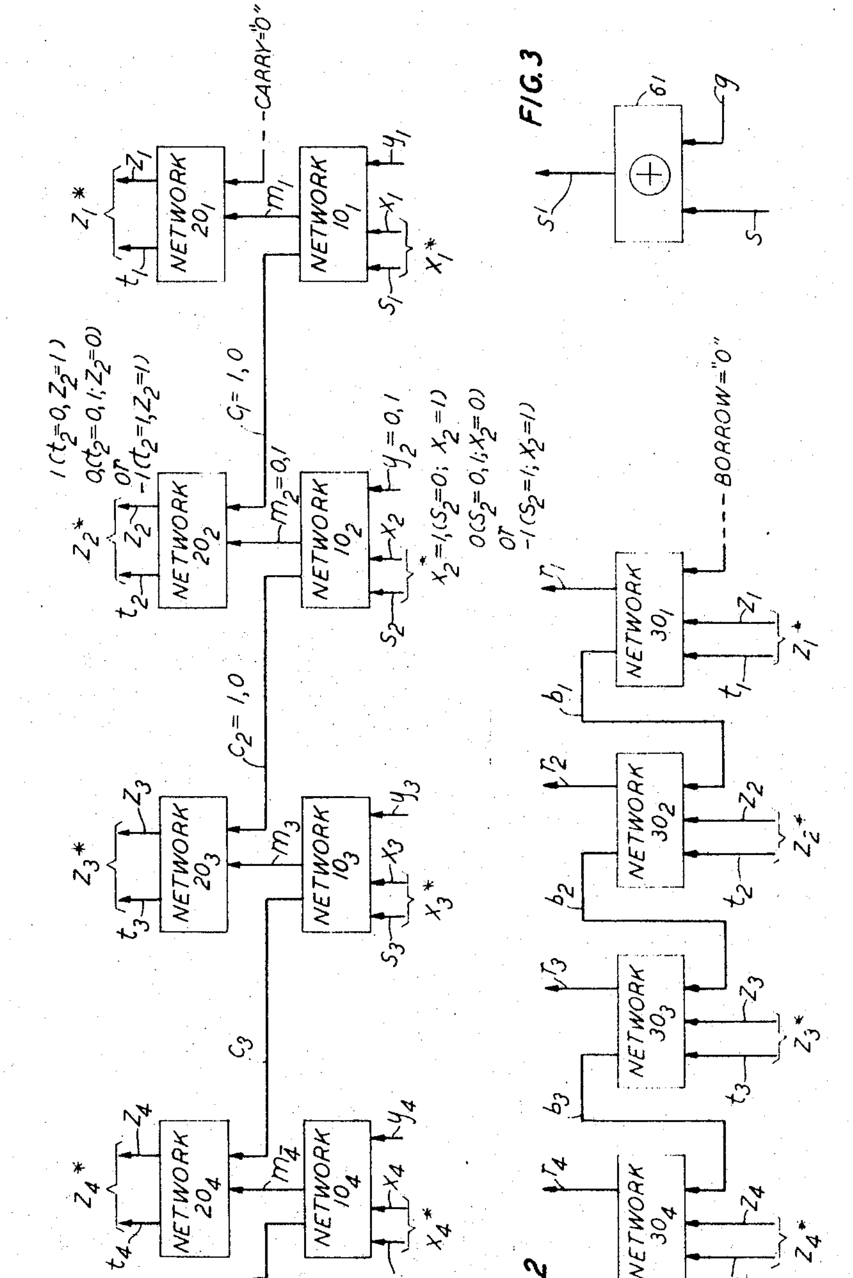
FIG. 1 is a schematic diagram of a basic adder arrangement which embodies one aspect of the present invention.
FIG. 2 is a schematic diagram illustrating assimilating circuitry which further embodies the principles of the present invention.
FIG. 3 is a diagram depicting the signals associated with an Exclusive OR gate 61 shown therein.
Figure 4A:
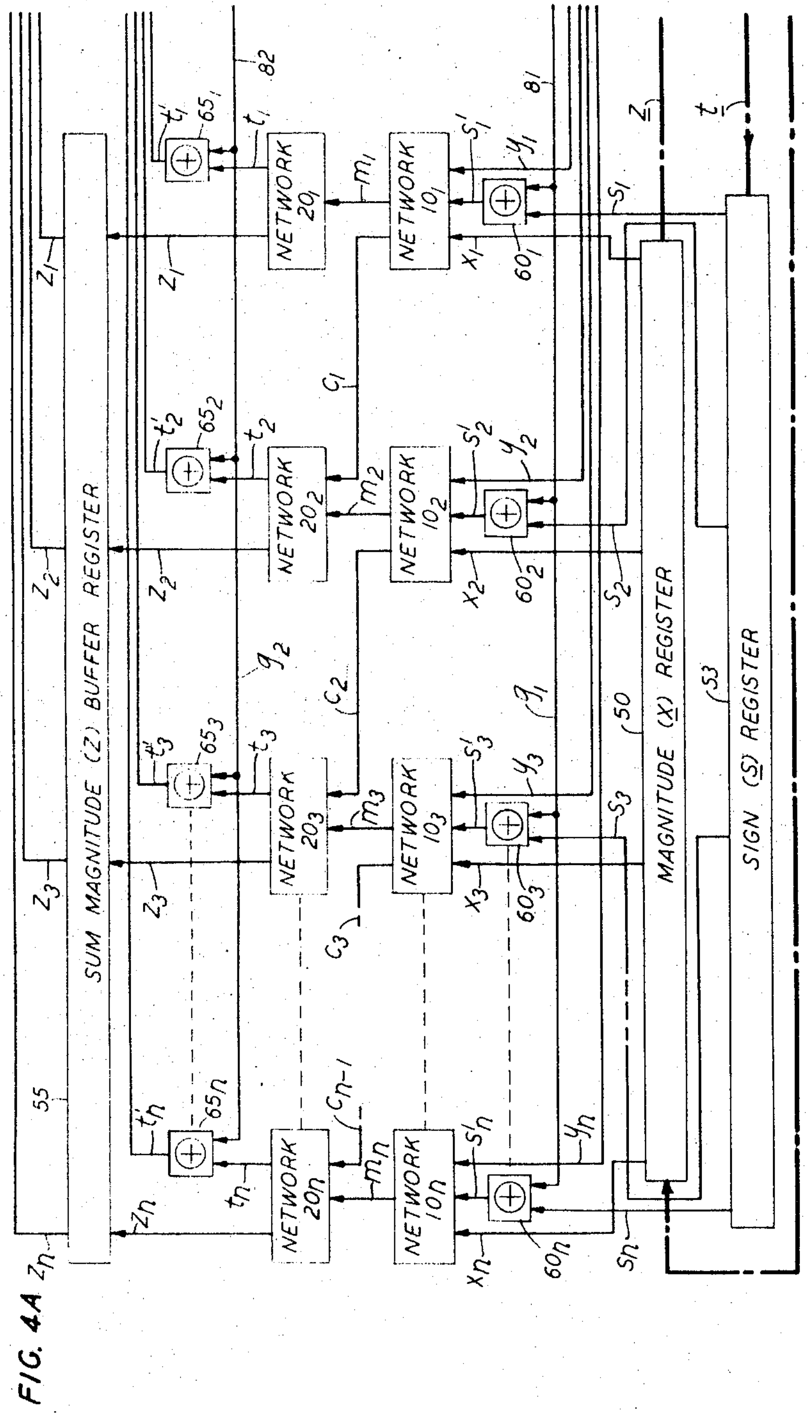
Figure 4B:
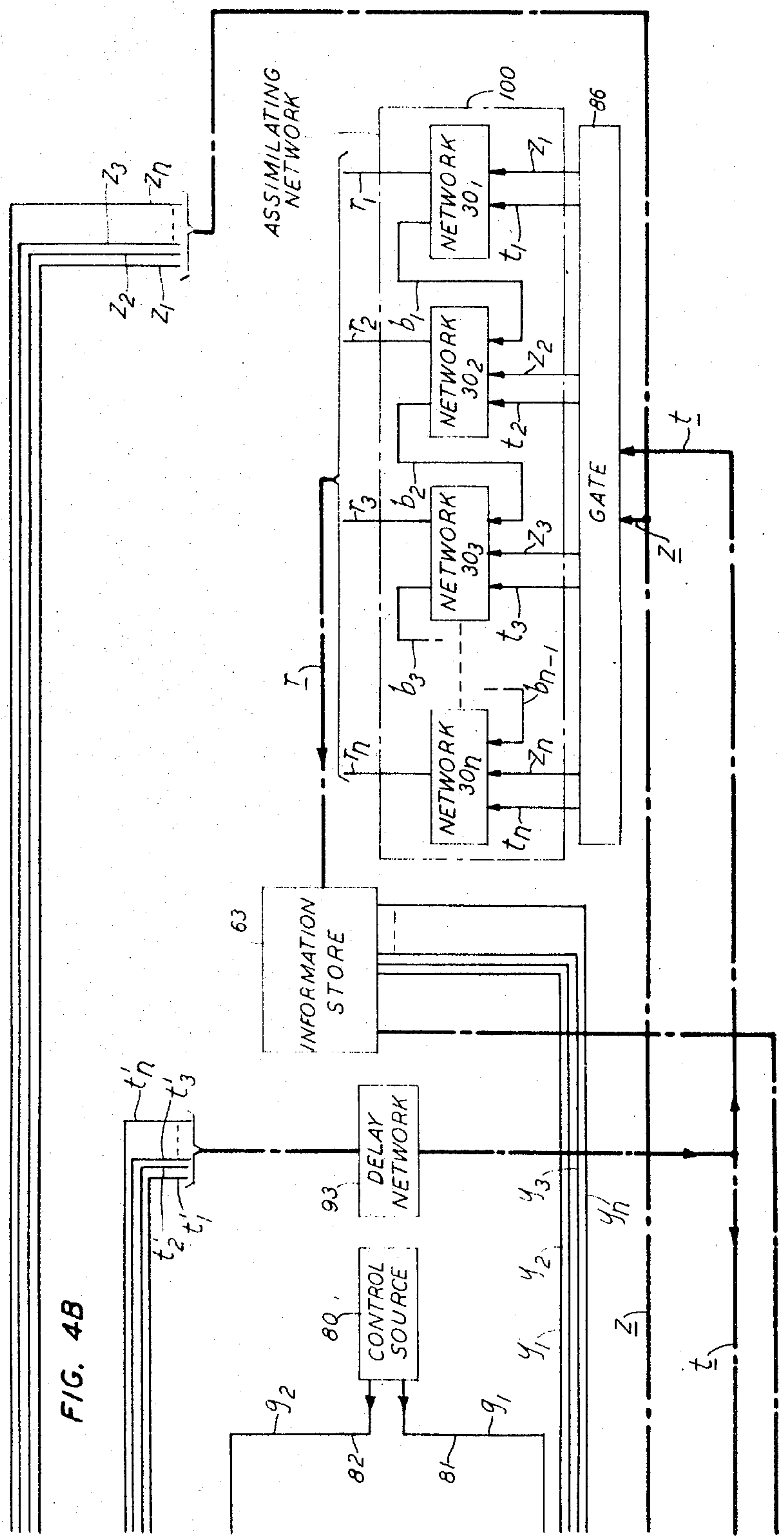
Figure 5A:
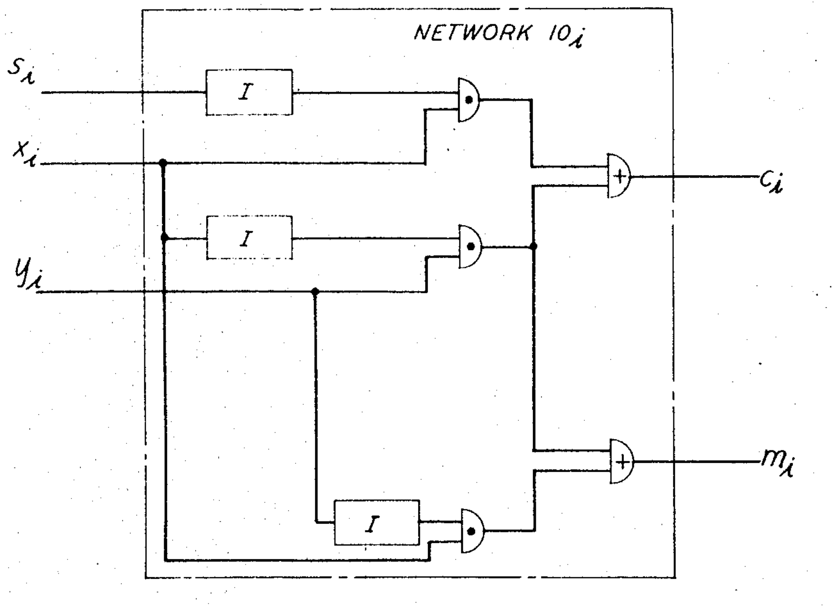
Figure 5B:
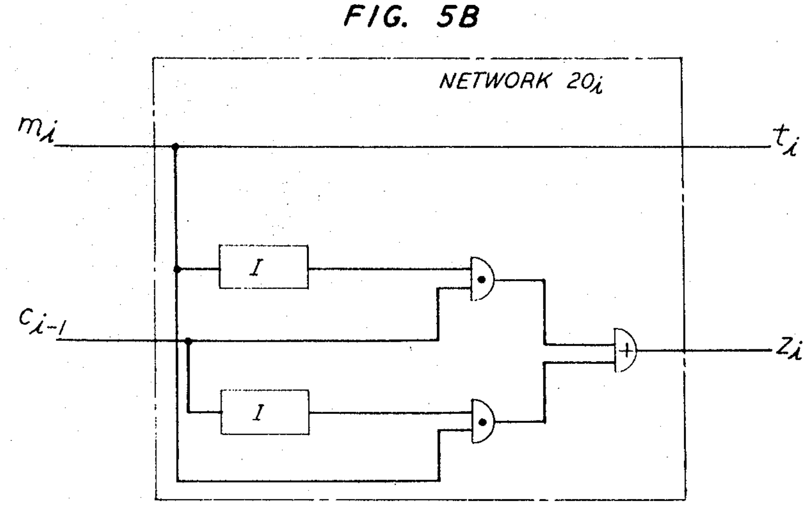
Figure 5C:
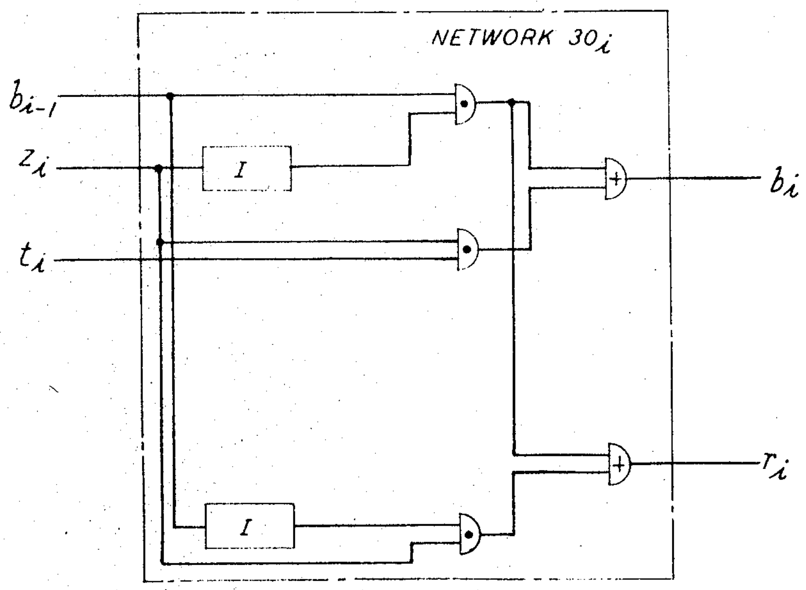
Figure 5D:
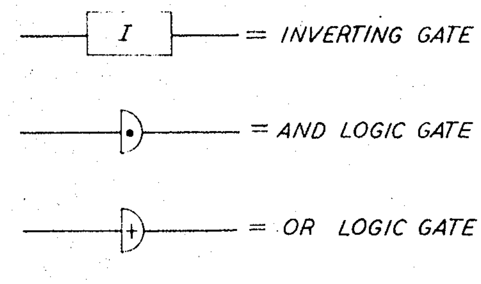

FIGS. 4A and 4B respectively comprise the left and right portions of a diagram depicting a composite adder-subtractor arithmetic unit made in accordance with the principles of the present invention;

FIG. 5A is a schematic diagram illustrating a specific embodiment for a plurality of combinatorial networks 10 shown in FIGS. 1 and 4A;

FIG. 5B is a schematic diagram illustrating a specific embodiment for a plurality of combinatorial networks 20 shown in FIGS. 1 and 4A;

FIG. 5C is a schematic diagram illustrating a specific embodiment for a plurality of combinatorial networks 30 shown in FIGS. 2 and 4B; and FIG. 5D is a legend identifying the logic gates shown in FIGS. 5A, 5B and 5C.

Referring now to FIG. 1, there is shown in schematic form a basic four-stage parallel adder organization. Each adder stage includes two combintaorial networks 10 and 20, and is responsive to a two-digit Boolean augend variable $x^*$ and a Boolean addend variable $y$ for producing a carry variable $c$ and a two-digit sum variable $z^*$. In addition, each network 10 is adapted to generate a partial sum variable $m$, and to supply this quantity to the associated network 20. The carry variable $c$ is produced in each stage by the network $\mathbf{10}_i$ included therein, and is supplied to the network $\mathbf{20}_{i+1}$ of the left adjacent stage which comprises the next higher significant digit.

The two-digit arithmetic quantities identified by a lower case letter with an superscripted asterisk, viz., $x^*$ and $z^*$ respectively comprising the digits $s$ and $x$, and $t$ and $z$, are signed-digit variables which can take on the values "−1," "0," or "+1" in accordance with the truth tables given by Tables I and II, below.

TABLE I

| s | x | x* |
|---|---|---|
| 0 | 0 | 0 |
| 0 | 1 | +1 |
| 1 | 0 | 0 |
| 1 | 1 | −1 |

TABLE II

| t | z | z* |
|---|---|---|
| 0 | 0 | 0 |
| 0 | 1 | +1 |
| 1 | 0 | 0 |
| 1 | 1 | −1 |

It is observed from Table I that the variable $s$ may be considered to represent the sign of $x^*$ ($x^*$ is positive when $s$ is a "0," and negative when $s$ is a "1"), while $x$ represents the magnitude of $x^*$. Similarly, $t$ and $z$ respectively comprise the sign and magnitude of the signed-digit sum variable $z^*$.

In accordance with one aspect of my invention, any number of arbitrary radix can be characterized by a non-unique combination of the signed-digits "−1," "0" and "+1." For example, Table III shows several possible alternative representations of the decimal number 6, with the first entry comprising the standard binary notation.

TABLE III.—ALTERNATIVE REPRESENTATIONS OF THE DECIMAL NUMBER 6

| $2^3$ | $2^2$ | $2^1$ | $2^0$ | |
|---|---|---|---|---|
| 0 | 1 | 1 | 0 | 4+2=6 |
| 1 | −1 | 1 | 0 | 8−4+2=6 |
| 1 | 0 | −1 | 0 | 8−2=6 |

With the above numerical encoding in mind, reference is now made to the second stage of the FIG. 1 adder organization which has the components thereof identified by the subscript 2. The permissible conceptual values for the Boolean variables $x^*_2$, $y_2$, $c_2$, $m_2$, and $z^*_2$ are shown alongside the second stage leads associated with these signals, with all zero values being electrically represented by no signal (a binary "0"), and all nonzero values being represented by the presence of a signal (a binary "1").

In overall scope, the second ($i$th) adder stage is operable to generate a "0" carry and a "+1" sum when the carry from the previous stage $c_{i-1}$ is a binary "1" (actual weighted value being "+2") and when $x_i^*$ and $y_i$ are both "0;" or when $c_{i-1}$ is a "1," $x_i^*$ is a "−1" and $y_i$ is a "1."

Similarly, $$z_i^*=\text{"0" and } c_i=\text{"0"}$$

if $$c_{i-1}=x_i^*=y_i=\text{"0"}$$

or if $$c_{i-1}=\text{"0,"}\ x_i^*=\text{"−1"}$$

and $$y_i=\text{"+1"}$$

or if $$c_{i-1}=\text{"1,"}\ x_i^*=\text{"−1"}$$

and $$y_i=\text{"0"}$$

$$z_i^*=\text{"−1" and } c_i=\text{"1"}$$

if $$c_{i-1}=\text{"0"}$$

and $x_i^*$ or $y_i$ but not both is a "+1"

$$z_i^*=\text{"0" and } c_i=\text{"1"}$$

if $$c_{i-1}=\text{"1"}$$

and $x_i^*$ or $y_i$ but not both is a "+1," or if $$c_{i-1}=\text{"0" and } x_i^*=y_i=\text{"+1"}$$

$$z_i^*=\text{"+1" and } c_i=\text{"1"}$$

if $$c_{i-1}=x_i^*=y_i=\text{"+1"}$$

and $$z_i^*=\text{"−1" and } c_i=\text{"0"}$$

if $$c_{i-1}=y_i=\text{"0"}$$

and $$x_i^*=\text{"−1"}$$

The above Boolean logic is effected in each stage by the combinatorial networks $\mathbf{10}_i$ and $\mathbf{20}_i$ which are operable in accordance with the Boolean functions respectively defined by the truth tables given as Table IV and V, infra, where $c_i$ and the partial sum $m_i$ are functions of $s_i$, $x_i$, and $y_i$, and where $t$ and $z$ are functions of $m_i$ and $c_{i-1}$.

TABLE IV.—TRUTH TABLE FOR THE COMBINATORIAL NETWORKS $10_i$

| $s_i$ | $x_i$ | $y_i$ | $m_i$ | $c_i$ |
|---|---|---|---|---|
| 0 | 0 | 0 | 0 | 0 |
| 0 | 0 | 1 | 1 | 1 |
| 0 | 1 | 0 | 1 | 1 |
| 0 | 1 | 1 | 0 | 1 |
| 1 | 0 | 0 | 0 | 0 |
| 1 | 0 | 1 | 1 | 1 |
| 1 | 1 | 0 | 1 | 0 |
| 1 | 1 | 1 | 0 | 0 |

TABLE V.—TRUTH TABLE FOR THE COMBINATORIAL NETWORKS $20_i$

| $m_i$ | $c_{i-1}$ | $t_i$ | $z_i$ |
|---|---|---|---|
| 0 | 0 | 0 | 0 |
| 0 | 1 | 0 | 1 |
| 1 | 0 | 1 | 1 |
| 1 | 1 | 1 | 0 |

By employing standard Boolean reduction techniques, Tables IV and V respectively dictate that each combinatorial circuit $\mathbf{10}_i$ must generate the functions $$c_i = \bar{s}_i x_i + \bar{x}_i y_i \quad (1)$$

and $$m_i = x_i \bar{y}_i + \bar{x}_i y_i \quad (2)$$

where equation (2) may be alternatively written $$m_i = x_i \oplus y_i \quad (2a)$$

with the operator $\oplus$ identifying the Exclusive OR logic function. Similarly, the network $\mathbf{20}_i$ must satisfy the functions $$t_i = m_i \quad (3)$$

and $$z_i = m_i \bar{c}_{i-1} + c_{i-1} \bar{m}_i$$

or $$m_i \oplus c_{i-1} \quad (4)$$

Typical logic gate circuitry for embodying the networks 10 and 20 is shown in FIGS. 5A and 5B, respectively, with a legend for the various gates employed therein being given in FIG. 5D. Hence, Equations 1 through 4 given above, together with the circuit interconnections shown in FIG. 1, completely define the basic adder structure.

It is observed that the Boolean function given in Equation 1 for the carry output signal $c_i$ from any adder stage depends only on the augend and addend variables $s_i$ and $x_i$, and $y_i$ supplied directly to that stage. That is to say, $c_i$ is not a function of any carry signals or arithmetic variables associated with any other adder stage. This carry independence eliminates the carry ripple propagation characterizing many prior art adders, since the network $\mathbf{20}_i$ in any stage receives only one invariant carry signal $c_{i-1}$ from the preceding stage during any single addition process.

To illustrate the operation of the FIG. 1 adder, assume that it is desired to start with an augend 3 (decimal), and to sequentially add the adends 2 and 5 (both decimal) thereto. Further, let each of these quantities be represented by a conventional binary coding, i.e., 3=0011, 2=0010, and 5=0101.

For the first addition, the augend variables $x_4$, $x_3$, $x_2$ and $x_1$ respectively comprise the digits "0," "0," "1," and "1," while the digits "0," "0," "1," and "0" embody the added variables $y_4$, $y_3$, $y_2$, and $y_1$. Since all the bits are positive in a conventional binary number representation, no signals are supplied to the leads associated with the variables $s_4$, $s_3$, $s_2$, or $s_1$, with this absence of signals (binary "0"s) being properly interpreted as plus signs, as indicated in Table I, supra. The addition operation 3+2=5 proceeds in accordance with Equations 1 through 4 in the conceptual manner indicated below:

| | |
|---|---|
| $x^*$= 0 0+1+1 x*=3 | |
| $y$=+0 0 1 0+y =2 | |
| $c$= 0 0 1 1 | From equation (1) operating on $x^*$ and $y$, |
| $m$= 0 0 0 1 | From equation (2) operating on $x^*$ and $y$, |
| $t$= 0 0 0 1 | From equation (3) operating on $m$, |
| $z$= 0 1 1 1 | From equation (4) operating on $m$ and $c$, |
| $z^*$= 0+1+1−1 z*=5 | From $t$ and $z$. |

Correlating the above mathematical process to an illustrative adder stage shown in FIG. 1, for example, the second stage, the variables $x_2^*$="+1"($s_2$="0;" $x_2$="1") and $y_2$="1," and supplied to the network $\mathbf{10}_2$. In accordance with Equation 1 and 2, the network $\mathbf{10}_2$ generates a "1" signal for $c_2$ and a "0" for $m_2$, and respectively supplies these digits to the networks $\mathbf{20}_3$ and $\mathbf{20}_2$.

Coincidently therewith, the network $\mathbf{10}_1$ operates on $s_1$="0," $x_1$="1" and $y_1$="0" and, by the precepts of Equation 1, supplies a carry signal $c_1$="1" to the network $\mathbf{20}_2$. Responsive to the incoming signals $m_2$="0" and $c_1$="1," the second stage network $\mathbf{20}_2$ produces $t_2$="0" and $z_2$="1," as respectively required by Equation 3 and 4. As indicated in Table II, supra, $t_2$="0" and $z_2$="1" correspond to $z^*_2$="+1," and this is the sum output $z^*_2$ for the second stage.

The three other adder stages function in a manner identically paralleling that given above for the second stage, and generate a composite output sum $$z^* = 0\ {+1}\ {+1}\ {-1} = 4\ {+2}\ {-1}$$

which yields the proper decimal sum 5 in signed-digit form.

The operation of the FIG. 1 adder will now be further illustrated by adding $y$=0 1 0 1 (a decimal 5) to the signed-digit intermediate sum $z^*$=0 +1 +1 −1. However, since the sum quantity 0 +1 +1 −1 (decimal 5) becomes the augend for the second addition, $x^*$ and not $z^*$ embodies these digits. The second above-identified summation proceeds as follows:

| | |
|---|---|
| $x^*$ { $s$ = 0 0 0 1 | |
| $x^*$ { $x$ = 0 1 1 1 $x^*$=5 | |
| $y$ =+0 1 0 1 +$y$ =5 | |
| $c$ = 0 1 1 0 | From equation (1) operating on $x^*$ and $y$, |
| $m$= 0 0 1 0 | From equation (2) operating on $x^*$ and $y$, |
| $t$ = 0 0 1 0 | From equation (3) operating on $m$, |
| $z$ = 1 1 1 0 | From equation (4) operating on $m$ and $c$, |
| $z^*$= 1 1 −1 0 $z^*$=10 | From $c$ and $z$. |

Hence, the above computation has shown that the sum of a stored-sign augend 5 and a conventional binary addend 5 as accomplished by the FIG. 1 adder yields the requisite decimal 10, represented in a signed-digit form.

In more general terms, the above discussion has illustrated that the FIG. 1 adder organization is responsive to an addend in conventional binary form, and to an augend in either a binary or signed-digit coding for generating the sum of these quantities.

It is observed that the sum $z^*$ produced by the FIG. 1 arrangement in general comprises a signed-digit representation of the corresponding arithmetic quantity. Accordingly, assimilating circuitry is required to convert the sum to conventional binary form to provide an interface between the FIG. 1 adder and other, associated computational elements, such as an information memory. Such an assimilating circuit is shown in FIG. 2.

The four-stage assimilating structure of FIG. 2 includes four combinatorial networks $\mathbf{30}_i$, each of which responds to a signed-digit $z_i^*$ comprising bits $t_i$ and $z_i$, and to a borrow signal $b_{i-1}$ from the previous stage, for generating a borrow variable $b_i$ and an output binary digit $r_i$. The four digits $r_4$, $r_3$, $r_2$, and $r_1$ comprise a conventional binary representation of the quantity identified by the sum digits $z_i^*$. In particular, assimilation of a signed-digit $z_i^*$ to binary form $r_i$ requires a borrow from the digit $z^*_{i+1}$ when $z^*_i$ equals "−1." The truth table for the assimilation process is given in Table VI, which follows:

TABLE VI.—ASSIMILATION

| $b_{i-1}$ | $t_i$ | $z_i$ | $b_i$ | $r_i$ |
|---|---|---|---|---|
| 0 | 0 | 0 | 0 | 0 |
| 0 | 0 | 1 | 0 | 1 |
| 0 | 1 | 0 | 0 | 0 |
| 0 | 1 | 1 | 1 | 1 |
| 1 | 0 | 0 | 1 | 1 |
| 1 | 0 | 1 | 0 | 0 |
| 1 | 1 | 0 | 1 | 1 |
| 1 | 1 | 1 | 1 | 0 |

By conventional reduction methods, the variables $r_i$ and $b_i$ may be expressed by the Boolean functions $$b_i = b_{i-1}\bar{z}_i + t_i z_i \quad (5)$$

and $$r_i = b_{i-1}\bar{z}_i + \bar{b}_{i-1} z_i$$

or $$b_{i-1} \oplus z_i \quad (6)$$

A combinatorial network 30 for effecting the above relationships is shown in FIG. 5C.

To depict the operation of the FIG. 2 organization, the quantity $z^* = +1\ +1\ -1\ 0$ (10 decimal) which resulted from the final addition example given above will now be assimilated. This process may be illustrated by the following computation:

| | |
|---|---|
| $t$=0 0 1 0 } $z^*$=10 | |
| $z$=1 1 1 0 | |
| $b$=0 0 1 0 | From equation (5) operating on $t$, $z$, and itself. |
| $r$=1 0 1 0 $r$=10 | From equation 6 opreating on $s$ and $z$. |

Correlating the above mathematical process to the FIG. 2 arrangement and examining, for example, the second assimilating stage, the network $30_2$ operates on $t_2$="1," $z_2$="1," and $b_1$="0" for generating $b_2$="1" and $r_2$="1" in accordance with Equations 5 and 6, respectively. Hence, the FIG. 2 assimilator has been shown by the above to accept any of the nonunique representations of a quantity, and to convert the form thereof into a conventional binary coding.

Before describing a composite arithmetic unit, reference is made to FIG. 3 which illustrates an Exclusive OR gate 61 having as input variables a control signal $g$ and a sign digit $s$ of a signed-digit variable $x^*$, and which generates an output variable $s'$. Table VII depicts the truth table for $s'$ as the Exclusive OR combinatorial function of the input variables $s$ and $g$.

TABLE VII

| $g$ | $s$ | $s'$ |
|---|---|---|
| 0 | 0 | 0 |
| 0 | 1 | 1 |
| 1 | 0 | 1 |
| 1 | 1 | 0 |

As pointed out hereinabove regarding Tables I and II, supra, the signed-digit variable $x^*$ is positive if $s$ is "0" and negative if $s$ is "1." Note from Table VII above that $s'$ is the same as $s$ if $g$="0" (the upper two entries in the table), and the complement of $s$ if $g$="1" (the lower two entries). Treating $s'$ as the sign indicator of a signed-digit variable $x^*$, it follows that $x^*$ will be negated by the gate 61 if the control signal $g$="1," and unaltered in sign by the gate 61 if $g$="0." This selective complementing process will be employed in the FIG. 4 arrangement in conjunction with both of the signed-digit variable $x^*$ and $z^*$ to effect subtraction operations in the manner discussed hereinafter.

Turning now to FIGS. 4A and 4B, hereinafter referred to as composite FIG. 4, there is shown a data processing arithmetic unit made in accordance with the principles of the present invention. The arrangement includes $n$ adder stages of the type and configuration shown in FIG. 1. Three $n$-stage registers, viz., and augend magnitude ($x$) register 50, an augend sign ($s$) register 53, and a sum magnitude ($z$) buffer register 55, are employed in a conventional double rank organization to respectively effect temporary storage of the augend variables $s_i$ and $x_i$, and the sum magnitude variables $z_i$. As discussed below, a register for the sum sign variables $t_i$ is not required.

An information store 63 is provided to supply an $n$-bit addend variable $y$ to the $n$ adder combinatorial networks $10_i$. Moreover, the augend magnitude variables $x_i$ are directly supplied to the networks $10_i$ by the register 50, while the augend sign variables $s_i$ are transformed to the variables $s_i'$ by a plurality of Exclusive OR gates 60. A control source 80 is employed to supply a first control signal $g_1$ to the gates $60_i$ via a lead 81, which is multiplied therewith.

The output sum sign variables $t_i$ are converted to the variables $t_i'$ by a second plurality of Exclusive OR gates 65, and then translated via a delay network 93 to the sign register 53. A second control signal $g_2$ is supplied by the control source 80 to the gates 65 via a lead 82.

In addition, a gate circuit 86 is provided to selectively pass a signed-digit sum $z^*$ consisting of sign variables $t_i'$ and magnitude variables $z_i$ to an $n$-stage assimilating network 100, of the type and configuration shown in FIG. 2, for conversion to a conventional binary form. The assimilated binary sum $r$ is then registered in a desired memory cell of the information store 63 on an efficient one information bit to one storage bit basis.

When the composite FIG. 4 arrangement is operating in an addition mode, the control source 80 does not energize the leads 81 or 82, i.e., $g_1 = g_2$="0." Therefore, in accordance with Table VII, $s_i' = s_i$ and $t_i' = t_i$, and neither the signed-digit augend $x^*$ nor the sum $z^*$ is negated.

At the inception of an addition process, either a binary augend is inserted in the magnitude register 50 by the information store 63, or a binary or signed-digit augend already exists in the registers 53 and/or 50. Additionally, the information store 63 is adapted to supply the binary addend variables $y_i$ to the adder combinatorial networks $10_i$.

When the registers 53 and 50 supply the $s_i$ and $x_i$ variables to the networks $10_i$, the $n$ adder stages operate on the variables $s_i$, $x_i$, and $y_i$ in the manner discussed above, and generate the signed-digit sum variables $t_i$ and $z_i$.

The magnitude variables $z_i$ are placed in the buffer memory 55, while the sign variables $t_i$ propagate unaltered through the Exclusive OR gates $65_i$, are delayed by the element 93, and are inserted in the sign register 53. This replacement of the $s_i$ by the $t_i$ in the sign register 53, without the requirement for a buffer sign register, follows from Equations 2 and 4 given above, which show that the $t_i$ are not a function of the $s_i$. Hence, after the sum magnitudes $z_i$ are secured in the buffer register 55, the $t_i$ may be directly placed in the register 53, and they will not be varied by a boot-strap process.

After the above operation terminates, the sum magnitude variables $z_i$ are translated from the buffer register 55 to the magnitude register 50. Hence, the sum variables $t_i$ and $z_i$ at this point reside in the sign and magnitude registers 53 and 50 respectively, and comprise the augend variables $s_i$ and $x_i$ for a subsequent addition. This next following addition occurs when the information store 63 supplies new addend variables $y_i$ to the adder networks $10_i$.

The above circuit sequencing recurs as long as it is desired to supplement an intermediate sum with new addends. When a final sum is reached, the gate 86 is operated to pass the stored-sign final sum $z^*$ to the assimilating network 100 for conversion to binary, and insertion in the information store 63.

Thus, it is manifest from the above discussion that an arbitrary sequence of numbers may be added by the FIG. 4 arrangement and, moreover, that each such addition takes a relatively short period of time since there is no carry ripple propagation down the adder chain.

A subtraction arithmetic process is essentially identical to the adder circuit sequencing given above, except that the control source 80 is adapted to supply the control signal(*s*) $g_1$, $g_2$, or both $g_1$ and $g_2$. In accordance with the description given above in conjunction with Table VII regarding the effect of Exclusive OR gates on signed-digit variables, it is observed that $g_1$="1" corresponds to complementing the $s_i$, and thereby negating the augend $x^*$, while $g_2$="1" complements the $t_i$, thereby changing the sign of the sum $z^*$. Thus, if $g_1=1$ and $g_2=0$, the output variable $z^*$ is given by $z^*=-x^*+y$, hence subtracting $x^*$ from $y$. Similarly, if $g_1$=" 1" and $g_2$="1,"

$$z^*=-(-x^*+y)=x^*-y$$

hence subtracting $y$ from $x^*$. Finally, if $g_1$="0" and $g_2$="1," the negating operation $z^*=-(x^*+y)$ is produced.

Hence, the FIG. 4 arithmetic unit has been shown by the above to perform in an efficient manner the addition and subtraction operations which form the basis of digital computation.

It is to be understood that the above-described arrangement is only illustrative of the application of the principles of the present invention. Numerous other configurations may be derived by those skilled in the art without departing from the spirit and scope thereof.

What is claimed is:

1. In combination, a plurality of cascaded adder stages each including first and second combinatorial networks, means for supplying augend Boolean variables $s$ and $x$ in a signed-digit binary form and an addend variable $y$ in a conventional single variable binary form to each of said first networks, said first networks including means for generating two Boolean variables $m$ and $c$ each in a conventional single-variable binary form and means for translating the variable $m$ to the associated second network and for translating the variable $c$ to the second network included in a contiguous stage, said second networks including means for generating two additional Boolean variables $t$ and $z$ each in a conventional single-variable binary form, wherein $$m=x\bar{y}+y\bar{x}$$
$$c=\bar{s}x+\bar{x}y$$
$$t=m, \text{ and}$$
$$z=m\bar{c}_{i-1}+c_{i-1}\bar{m}$$

where $c_{i-1}$ comprises the carry signal translated thereto from the previous stage.

2. A combination as in claim 1 further comprising a first plurality of Exclusive OR gates each interposed between a different one of said first combinatorial networks and said Boolean variable supplying means for selectively complementing the associated variable $s$.

3. A combination as in claim 2 further comprising a second plurality of Exclusive OR gates each connected to a different one of said second combinatorial networks for selectively complementing the associated variable $t$.

4. A combination as in claim 3 wherein said Boolean variable supplying means comprises a first register for supplying the variables $x$, a second register for supplying the variables $s$ and means for supplying the variable $y$ in a conventional binary coding.

5. A combination as in claim 4 further comprising a buffer register connected to said second combinatorial networks.

6. A combination as in claim 5 wherein said means for supplying the variable $y$ in a conventional binary coding comprises an information store.

7. A combination as in claim 6 further comprising control means for selectively energizing said first and second plurality for Exclusive OR gates.

8. A combination as in claim 1 further comprising assimilating means connected to said second networks for receiving the variables $t$ and $z$ and converting them to a conventional single-variable binary form.

9. A combination as in claim 8 wherein said assimilating means comprises an additional plurality of combinatorial networks for generating the Boolean variable $r$ and $b$, means for supplying the variables $t$ and $z$ from said second networks as inputs to said additional combinatorial networks, and means for supplying the output variable $b$ from each of said additional networks as an input variable $b_{i-1}$ to a contiguous such network, wherein $$r=b_{i-1}\bar{z}+\bar{b}_{i-1}z$$

and $$b=b_{i-1}\bar{z}+tz$$

10. A combination as in claim 9 further comprising a first plurality of Exclusive OR gates each interposed between a different one of said first combinatorial networks and said Boolean variable supplying means for selectively complementing the associated variable $s$.

11. A combination as in claim 10 further comprising a second plurality of Exclusive OR gates interposed between said second combinatorial networks and said assimilating means for selectively complementing the associated variable $t$.

12. In combination in a digital subtracting arrangement, an adder including three input and two output ports, means connected to one input port of said adder for supplying thereto a conventional binary quantity $y$ and respectively connected to the other two input ports for supplying thereto a signed-digit quantity $x^*$ comprising two Boolean variables $s$ and $x$ that respectively designate the sign and magnitude of $x^*$, where $x^*$ is defined by the truth table:

| $s$ | $x$ | $x^*$ |
|---|---|---|
| 0 | 0 | 0 |
| 0 | 1 | +1 |
| 1 | 0 | 0 |
| 1 | 1 | −1 |

and first Exclusive OR logic means interposed only between said Boolean variable supplying means and the input port of said adder to which the variable $s$ is applied.

13. A combination as in claim 12 wherein sign and magnitude variables appear respectively at said two output ports, said combination further comprising second Exclusive OR logic means connected only to the output port of said adder at which said sign variable appears.

14. In combination in a parallel adder organization, a plurality of cascaded adder stages each including first and second combinatorial networks, means for supplying a signed-digit number $x^*$ and a nonsigned-digit number $y$ to each of said first networks, said first networks including means for supplying a partial sum $m$ to the associated second network and a carry signal $c$ to the second network of an adjacent stage, wherein said carry signals generated by said first combinatorial networks are mutually independent of each other.

15. A combination as in claim 14 wherein the number $x^*$ includes two variables $s$ and $x$, wherein $x^*$ is defined by the truth table

| $s$ | $x$ | $x^*$ |
|---|---|---|
| 0 | 0 | 0 |
| 0 | 1 | +1 |
| 1 | 0 | 0 |
| 1 | 1 | −1 |

and where said second networks include means for generating the Boolean variables $t$ and $z$, where $$m = x\bar{y} + y\bar{x}$$
$$c = \bar{s}x + \bar{x}y$$
$$t = m, \text{ and}$$
$$z = m\bar{c}_{i-1} + c_{i-1}\bar{m}$$

with $c_{i-1}$ comprising the carry signal supplied thereto by an associated adder stage.

References Cited

Algirdas Avizienis, Signed-Digit Number Representations for Fast Parallel Arithmetic, IRE Transactions on Electronic Computers, September 1961, pp. 389–400.

Algirdes Avizienis, Binary-Compatible Signed-Digit Arithmetic, Proceedings-Fall Joint Computer Conference, 1964, pp. 663–672.

MALCOLM A. MORRISON, Primary Examiner

D. H. MALZAHN, Assistant Examiner